US010222794B2

(12) United States Patent
Deng et al.

(10) Patent No.: US 10,222,794 B2
(45) Date of Patent: Mar. 5, 2019

(54) REMOTE CONTROLLER USING RETAINING DEVICE

(71) Applicant: SZ DJI TECHNOLOGY CO., LTD., Shenzhen (CN)

(72) Inventors: Lei Deng, Shenzhen (CN); Yin Tang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 168 days.

(21) Appl. No.: 15/448,819

(22) Filed: Mar. 3, 2017

(65) Prior Publication Data

US 2017/0176987 A1 Jun. 22, 2017

Related U.S. Application Data

(63) Continuation of application No. PCT/CN2014/088047, filed on Sep. 30, 2014.

(51) Int. Cl.
F16B 2/10 (2006.01)
F16M 11/10 (2006.01)
(Continued)

(52) U.S. Cl.
CPC ......... G05D 1/0038 (2013.01); B64C 39/024 (2013.01); F16B 2/10 (2013.01);
(Continued)

(58) Field of Classification Search
CPC .................................. A63H 30/04; B64F 1/228
See application file for complete search history.

(56) References Cited

U.S. PATENT DOCUMENTS 5,791,609 A 8/1998 Hankins
8,690,460 B2 4/2014 Kuehl
(Continued)

FOREIGN PATENT DOCUMENTS

CN 201795239 U 4/2011
CN 202634521 U 12/2012
(Continued)

OTHER PUBLICATIONS

The World Intellectual Property Organization (WIPO) International Search Report for PCT/CN2014/088047 dated Jun. 29, 2015 6 Pages.

Primary Examiner — Simon Nguyen
(74) Attorney, Agent, or Firm — Anova Law Group, PLLC

(57) ABSTRACT

A remote controller comprises a gripping member, a control stick arranged on the gripping member, and a retaining device installed on the gripping member. The retaining device comprises a support mechanism, a clamping mechanism rotatably installed on the support mechanism, and a communication mechanism rotatably connected to the clamping mechanism. The clamping mechanism comprises a first clamping part and a second clamping part opposite to the first clamping part. The communication mechanism comprises a receiving member, a connecting shaft arranged on the receiving member and pivotably connecting the receiving member with the second clamping part, and an antenna arranged on the receiving member and configured to transfer data. The connecting shaft is configured to allow the receiving member to rotate relative to the second clamping part and to be received between the first clamping part and the second clamping part.

20 Claims, 8 Drawing Sheets

(51) Int. Cl.
*F16M 13/02* (2006.01)
*F16M 13/04* (2006.01)
*G05D 1/00* (2006.01)
*B64C 39/02* (2006.01)
*G05G 9/047* (2006.01)
*H04N 5/232* (2006.01)
*F16M 11/04* (2006.01)
*B64D 47/08* (2006.01)

(52) U.S. Cl.
CPC .......... *F16M 11/041* (2013.01); *F16M 11/10* (2013.01); *F16M 13/02* (2013.01); *F16M 13/04* (2013.01); *G05G 9/047* (2013.01); *B64C 2201/146* (2013.01); *B64D 47/08* (2013.01); *H04N 5/23203* (2013.01)

(56) References Cited

U.S. PATENT DOCUMENTS

| | | | | |
|---|---|---|---|---|
| 2006/0293102 | A1* | 12/2006 | Kelsey | A63H 30/04 463/37 |
| 2010/0125366 | A1* | 5/2010 | Huang | A63H 30/04 700/275 |
| 2011/0130066 | A1* | 6/2011 | Amireh | A63H 27/02 446/34 |
| 2011/0240382 | A1* | 10/2011 | Gettings | B62D 55/075 180/9.1 |
| 2012/0088436 | A1* | 4/2012 | Grossman | A63H 17/395 446/454 |
| 2012/0215393 | A1* | 8/2012 | Schiedegger | B60P 3/11 701/23 |
| 2014/0183238 | A1 | 7/2014 | Lin | |
| 2015/0314207 | A1* | 11/2015 | Chen | A63H 30/04 446/37 |

FOREIGN PATENT DOCUMENTS

| | | |
|---|---|---|
| CN | 202694151 U | 1/2013 |
| CN | 203211214 U | 9/2013 |
| CN | 203601465 U | 5/2014 |
| CN | 203703540 U | 7/2014 |
| CN | 103994310 A | 8/2014 |
| CN | 203838864 U | 9/2014 |
| CN | 204291666 U | 4/2015 |
| JP | 2002051138 A | 2/2002 |
| JP | 2003144748 A | 5/2003 |
| JP | 2013135317 A | 7/2013 |

\* cited by examiner

REMOTE CONTROLLER USING RETAINING DEVICE

CROSS-REFERENCE TO RELATED APPLICATION

This is a continuation application of International Application No. PCT/CN2014/088047, filed on Sep. 30, 2014, the entire contents of which are incorporated herein by reference.

TECHNICAL FIELD

The present disclosure relates to a remote controller using a retaining device.

BACKGROUND

With the development of science and technology, aerial photography has emerged and become increasing popular. Aerial photography with unmanned aerial vehicles is increasingly favoured by photographers due to the low costs and safety thereof in comparison with manned aerial photography. Aerial photography with unmanned aerial vehicles is usually carried out by using an aerial vehicle which carries an image capturing device such as a video camera or a photo camera for shooting. Usually, a photographer controls the aerial vehicle to fly via a remote controller; in order to view the shooting effect in time, it is needed to install a display device such as a display or a mobile phone on the remote controller. The display device is fixed on the remote controller via a retaining device and is electrically connected to the image capturing device via a transceiver communication device, so as to receive and display a real time image captured by the image capturing device. The above-mentioned retaining device and the transceiver communication device are independent of each other and are respectively arranged on the remote controller, and thus the remote controller is relatively large in overall volume and occupies a relatively large space; and at the same time, the remote controller which is installed with the retaining device, the display device and the transceiver communication device is relatively heavy in overall weight and is not convenient for storing and operation by a photographer.

SUMMARY

In view of the above-mentioned, it is needed to provide a remote controller using a retaining device, which has a compact structure and a relatively light weight.

In accordance with the present disclosure, there is provided a remote controller comprising a gripping member, a control stick arranged on the gripping member, and a retaining device installed on the gripping member. The retaining device comprises a support mechanism, a clamping mechanism rotatably installed on the support mechanism, and a communication mechanism rotatably connected to the clamping mechanism. The clamping mechanism comprises a first clamping part and a second clamping part opposite to the first clamping part. The communication mechanism comprises a receiving member, a connecting shaft arranged on the receiving member and pivotably connecting the receiving member with the second clamping part, and an antenna arranged on the receiving member and configured to transfer data. The connecting shaft is configured to allow the receiving member to rotate relative to the second clamping part and to be received between the first clamping part and the second clamping part.

In some embodiments, the second clamping part comprises a connecting hole formed through the second clamping part and a plurality of engaging teeth protruding from an inner wall of the connecting hole. A first end of the connecting shaft is connected to the receiving member and a second end of the connecting shaft is rotatably received in the connecting hole. The connecting shaft comprises matching teeth formed on the second end and engaged with the plurality of engaging teeth.

In some embodiments, the clamping mechanism further comprises a housing, a movable member movably arranged on the housing, and an elastic member arranged between the housing and the movable member. The first clamping part is connected to the housing. The second clamping part is formed on the movable member. A first end of the elastic member is connected to the housing and a second end of the elastic member abuts against the movable member.

In some embodiments, the housing comprises an installation part. The movable member comprises a stopping part corresponding to the installation part. The first end of the elastic member is connected to the installation part and the second end of the elastic member abuts against the stopping part.

In some embodiments, the housing is a first housing and the clamping mechanism further comprises a second housing fastened with the first housing. The first clamping part is formed on the second housing. One end of the movable member is movably received between the first housing and the second housing.

In some embodiments, the clamping mechanism further comprises a sliding member overlying the first housing. The sliding member comprises a supporting part protruding from the sliding member. The movable member overlies the sliding member and is partly received together with the sliding member between the first housing and the second housing. The second clamping part is sheathed on the supporting part.

In some embodiments, the clamping mechanism further comprises a locking assembly arranged on the first clamping part and comprising a snap-fit part. The sliding member further comprises a locating part snap-fitting with the snap-fit part.

In some embodiments, the snap-fit part is made of an elastic material and is configured to be placed into or released from the locating part when elastic deformation occurs. The locating part is made of an elastic material and is configured to be placed into or released from the snap-fit part when elastic deformation occurs.

In some embodiments, the locking assembly comprises a pressing member, an actuation member received in the first clamping part, and an elastic reset member received in the first clamping part. One end of the elastic reset member abuts against the actuation member and another end of the elastic reset member abuts against the first clamping part. The snap-fit part is formed on the actuation member. The pressing member is movably installed on the first clamping part and abuts against the actuation member.

In some embodiments, the actuation member further comprises a pivot connection part rotatably arranged in the first clamping part and a transmission part formed on the pivot connection part. The snap-fit part is formed on the pivot connection part and faces away from the transmission part. The actuation member abuts against the pressing member.

In some embodiments, the gripping member comprises a supporting part and a gripping part formed on the supporting part. The control stick is arranged on the gripping part. The retaining device is rotatably sheathed on the supporting part via a bush.

In some embodiments, the supporting part comprises a plurality of limiting pits circumferentially arranged on the supporting part and spaced apart from each other. The first sheathing part comprises a limiter corresponding to the limiting pits. The limiter protrudes out of a surface of the first sheathing part and being received in at least one of the limiting pits.

Also in accordance with the present disclosure, there is provided a remote controller comprising a main body and a retaining device. The retaining device comprises a clamping mechanism comprising a clamping space, a support mechanism rotatably connected to the clamping mechanism, and a communication mechanism movably connected to the clamping mechanism. An end of the support mechanism that is far away from the clamping mechanism is connected to the main body. The communication mechanism is configured to be received in the clamping space, when clamping an object, move relative to the clamping mechanism to an outside of the clamping space, and when not clamping the object, move relative to the clamping mechanism into the clamping space.

In some embodiments, the communication mechanism is rotatably connected to the clamping mechanism and configured to rotate into the receiving space, or the communication mechanism is slidably connected to the clamping mechanism and configured to slide into the receiving space.

In some embodiments, a size of the clamping space is adjustable.

In some embodiments, the clamping mechanism comprises a first clamping part and a second clamping part opposite to the first clamping part. The first clamping part and the second clamping part together form the clamping space. The first clamping part and the second clamping part are configured to slide relative to each other so as to change the size of the clamping space.

In some embodiments, the end of the support mechanism that is far away from the clamping mechanism is rotatably connected to the main body.

In some embodiments, the support mechanism comprises a support limiting part. The main body comprises a support matching part matching the support limiting part so as to restrict a rotation angle of the support mechanism relative to the main body.

In some embodiments, the support matching part comprises a plurality of limiting pits arranged on the main body. The support limiting part comprises a limiter arranged on the support mechanism. The limiter is selectively received in one of the limiting pits.

In some embodiments, the main body comprises a U-shaped gripping member and control sticks arranged at two ends of the gripping member. The end of the support mechanism that is far away from the clamping mechanism is sheathed at a middle part of the gripping member.

A retaining device as disclosed above integrates the communication mechanism into the clamping mechanism, and when not in use, the communication mechanism overlies on and is fastened to the clamping mechanism; and when in use, the communication mechanism is opened up to a required angle relative to the clamping mechanism. With such structures, a remote controller using a retaining device has a compact overall structure and a relatively light weight.

Figure 1:
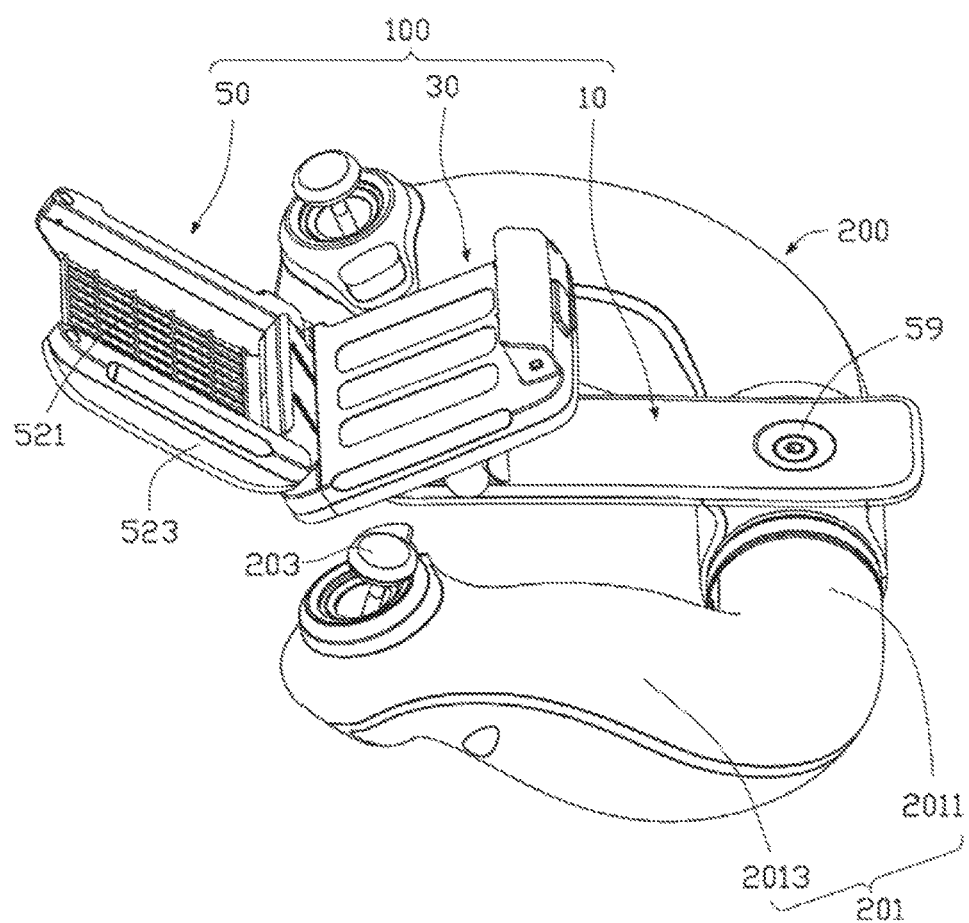
FIG. 1 is a perspective schematic view of the assembly of a retaining device and a remote controller using the retaining device according to one embodiment of the present disclosure.

DESCRIPTION OF REFERENCE NUMERALS
FOR MAIN ELEMENTS

TABLE 1

| | |
|---|---:|
| Remote controller | 200 |
| Gripping member | 201 |
| Supporting part | 2011 |
| Gripping part | 2013 |
| Limiting pit | 2014 |
| Control stick | 203 |
| Retaining device | 100 |
| Support mechanism | 10 |
| First support member | 12 |
| First supporting part | 121 |
| Receiving hole | 1211 |
| First sheathing part | 123 |
| First receiving part | 1231 |
| Limiter | 1233 |
| Matching part | 125 |
| Second support member | 14 |
| Second supporting part | 141 |
| Second sheathing part | 143 |
| Second receiving part | 1431 |
| Snapping part | 145 |
| Seat | 16 |
| Pivot connection hole | 161 |
| Limiting recess | 163 |
| Pivot shaft | 18 |
| Stopper | 19 |
| Clamping mechanism | 30 |
| Connecting assembly | 32 |
| First housing | 321 |
| First receiving space | 3211 |
| Installation part | 3213 |
| Connecting member | 323 |
| Locating protrusion | 3231 |
| Through hole | 3233 |
| Second housing | 325 |
| Second receiving space | 3251 |
| First clamping part | 3253 |
| Movable assembly | 34 |
| Sliding member | 341 |
| Locating part | 3411 |
| Supporting part | 3413 |
| Movable member | 343 |
| Plate body | 3430 |
| Stopping part | 3431 |

TABLE 1-continued

| | |
|---|---|
| Second clamping part | 3433 |
| Connecting hole | 3435 |
| Elastic assembly | 36 |
| Elastic member | 361 |
| Locking assembly | 38 |
| Actuation member | 381 |
| Pivot connection part | 3811 |
| Transmission part | 3813 |
| Snap-fit part | 3815 |
| Pressing member | 383 |
| Communication mechanism | 50 |
| Receiving member | 52 |
| Body | 521 |
| Accommodating part | 523 |
| Receiving groove | 5231 |
| Connecting part | 525 |
| Connecting shaft | 54 |
| Joining part | 541 |
| Rotathig part | 543 |
| Antenna | 56 |
| Covering member | 58 |

Some embodiments of present disclosure are further described below with reference to the accompanying drawings.

DETAILED DESCRIPTION OF EMBODIMENTS

The present disclosure provides a remote controller, which comprises a main body, and a retaining device mounted on the main body.

In some embodiments, the retaining device comprises a clamping mechanism and a communication mechanism, the clamping mechanism is provided with a clamping space, and the communication mechanism is movably connected to the clamping mechanism and is able to be received in the clamping space. When the clamping mechanism clamps an object to be clamped, the communication mechanism can be moved relative to the clamping mechanism to the outside of the clamping space; and when the clamping mechanism does not clamp the object to be clamped, the communication mechanism can be moved relative to the clamping mechanism into the clamping space.

In some embodiments, the communication mechanism is rotatably connected to the clamping mechanism, and can rotate into the receiving space; or the communication mechanism is slidably connected to the clamping mechanism, and can slide into the receiving space.

In some embodiments, the size of the clamping space is adjustable. For example, the clamping mechanism comprises a first clamping part and a second clamping part opposite to the first clamping part. The first clamping part and the second clamping part form the clamping space together, and the first clamping part and the second clamping part can slide relative to each other so as to change the size of the clamping space.

In some embodiments, the clamping mechanism further comprises a locking assembly arranged on the first clamping part, and a locating part which can be detachably snapped with the locking assembly is formed on the second clamping part.

For example, the communication mechanism is rotatably connected to the clamping mechanism via a connecting shaft, the clamping mechanism is provided with a plurality of engaging teeth, and the connecting shaft is provided with matching teeth selectively engagable with the plurality of engaging teeth so as to restrict a rotation angle of the communication mechanism relative to the clamping mechanism.

In some embodiments, further comprised is a support mechanism, and the clamping mechanism is rotatably connected to the support mechanism. The end of the support mechanism which is far away from the clamping mechanism is connected to the main body.

In some embodiments, the support mechanism is provided with a rotation limiting part, and the clamping mechanism is provided with a rotation matching part matching with the rotation limiting part so as to restrict a rotation angle of the clamping mechanism relative to the support mechanism.

In some embodiments, the support mechanism comprises a seat and a pivot shaft rotatably arranged in the seat, and the clamping mechanism is pivotably connected to the seat via the pivot shaft; the rotation limiting part is a plurality of limiting recesses arranged on the seat, the rotation matching part is a locating protrusion arranged on the clamping mechanism, and the locating protrusion may be selectively received in one of the limiting recesses.

In some embodiments, the end of the support mechanism which is far away from the clamping mechanism is rotatably connected to the main body.

In some embodiments, the support mechanism is provided with a support limiting part, and the main body is provided with a support matching part matching with the support limiting part so as to restrict a rotation angle of the support mechanism relative to the main body.

For example, the support matching part is a plurality of limiting pits arranged on the main body; and the support limiting part is a limiter arranged on the support mechanism, and the limiter may be selectively received in one of the limiting pits.

In some embodiments, the main body comprises a U-shaped gripping member and control sticks arranged at two ends of the gripping member; and the end of the support mechanism which is far away from the clamping mechanism is sheathed at the middle part of the gripping member.

Some embodiments of the present disclosure are described in detail below with reference to the accompanying drawings.

With reference to FIG. 1, a remote controller 200 in one embodiment of the present disclosure is used for remotely controlling an aerial vehicle (not shown in the figure) carrying an image capturing device (not shown in the figure) such as a video camera or a photo camera. A retaining device 100 is installed on the remote controller 200, the retaining device 100 is used for installing a display device (not shown in the figure) such as a display or a mobile phone, and the retaining device 100 can transmit data with the display device, the image capturing device and the remote controller 200, so that the display device receives and displays a real time image captured by the image capturing device and a photographer can thereby view the shooting effect in time.

Figure 2:
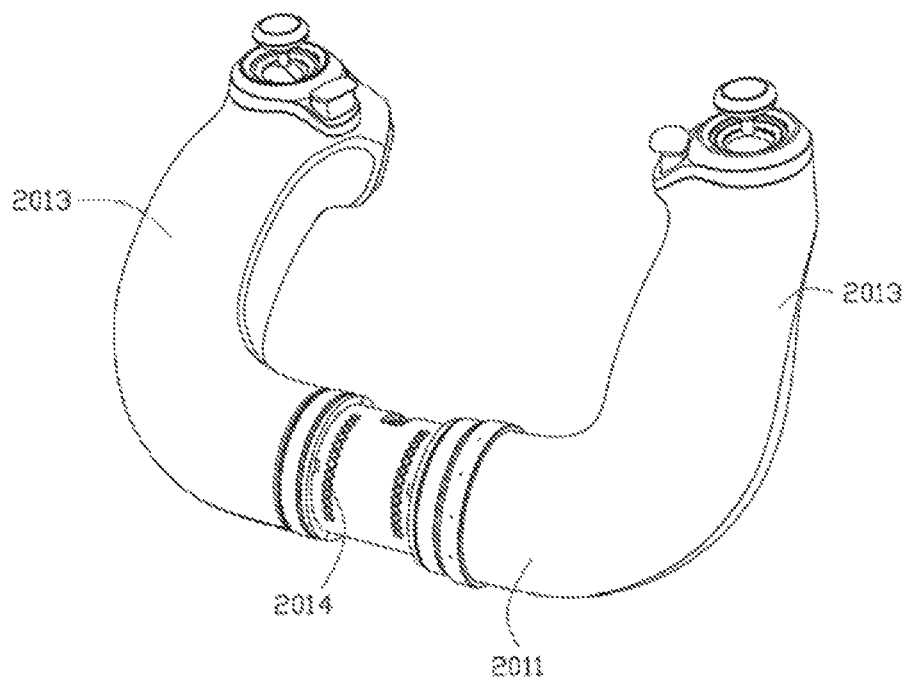
FIG. 2 is a perspective view of a gripping member of the remote controller as shown in FIG. 1.
Figure 3:
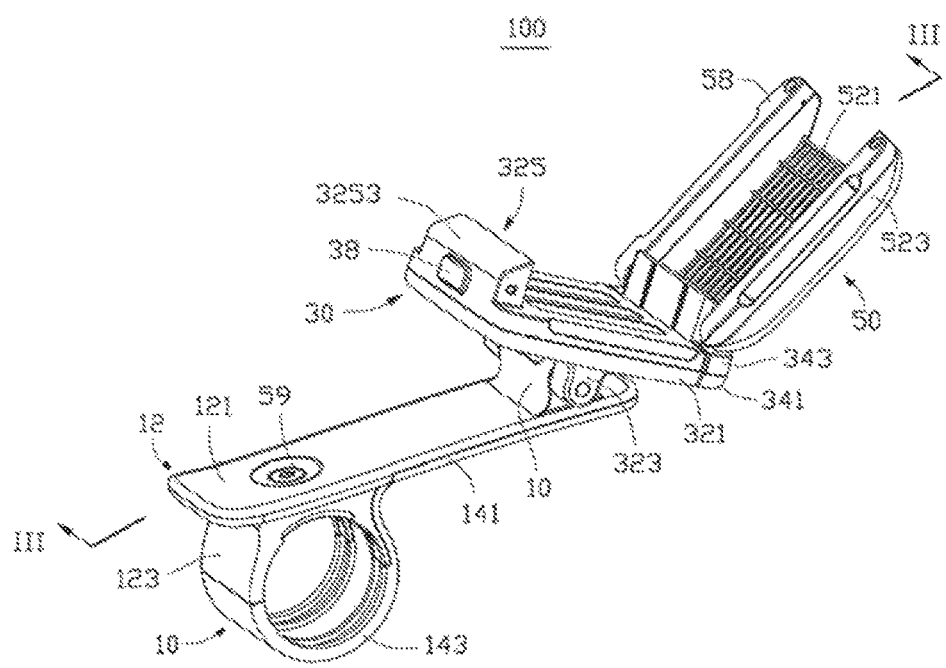
FIG. 3 is a perspective view of the retaining device as shown in FIG. 1.
Figure 4:
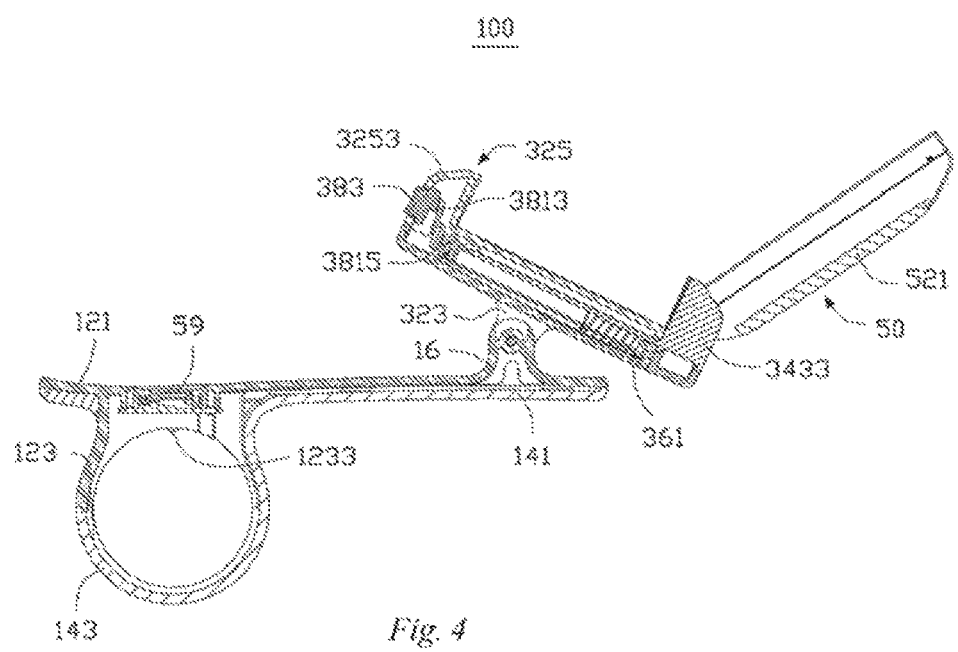
FIG. 4 is a sectional view of the retaining device as shown in FIG. 3 along the III-II line.
Figure 5:
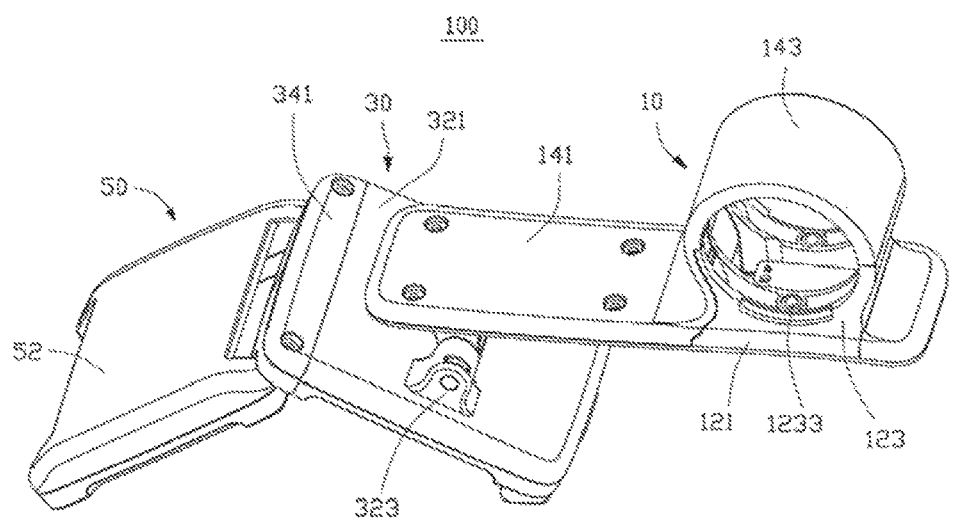
FIG. 5 is a view of the retaining device as shown in FIG. 3 from another angle.
Figure 6:
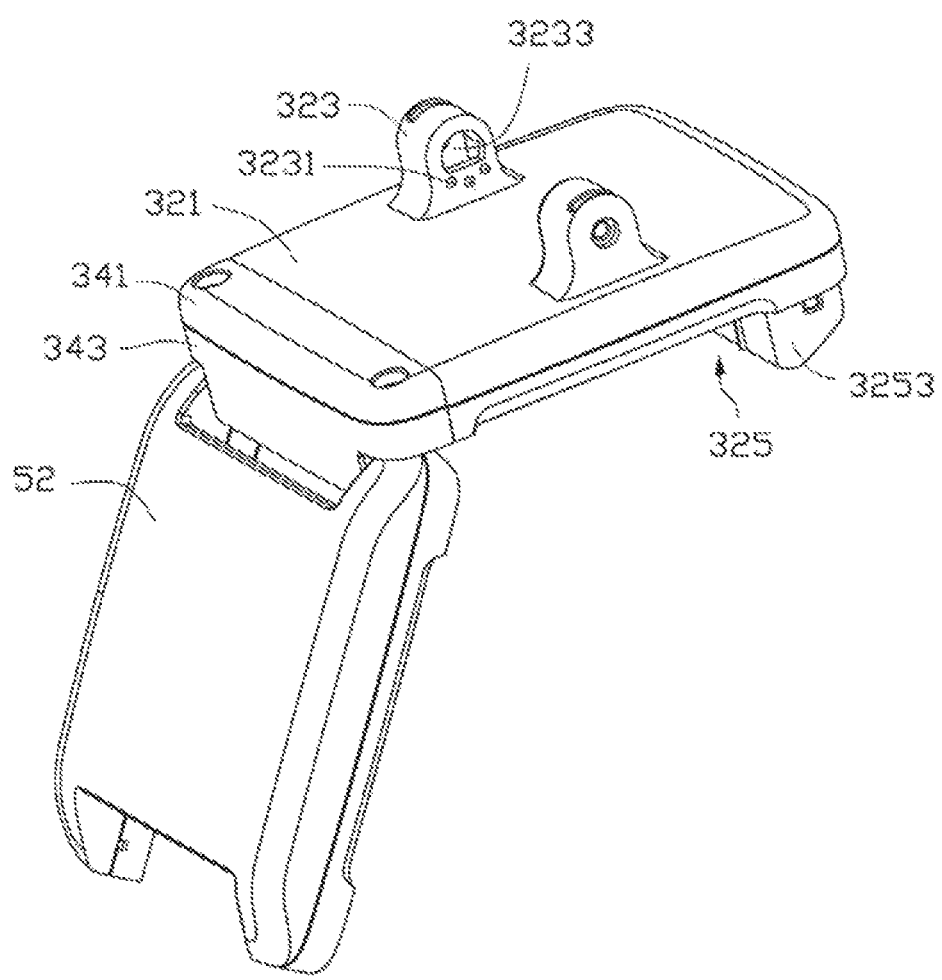
FIG. 6 is a perspective schematic view of the assembly of a clamping mechanism and a communication mechanism of the retaining device as shown in FIG. 5.
Figure 7:
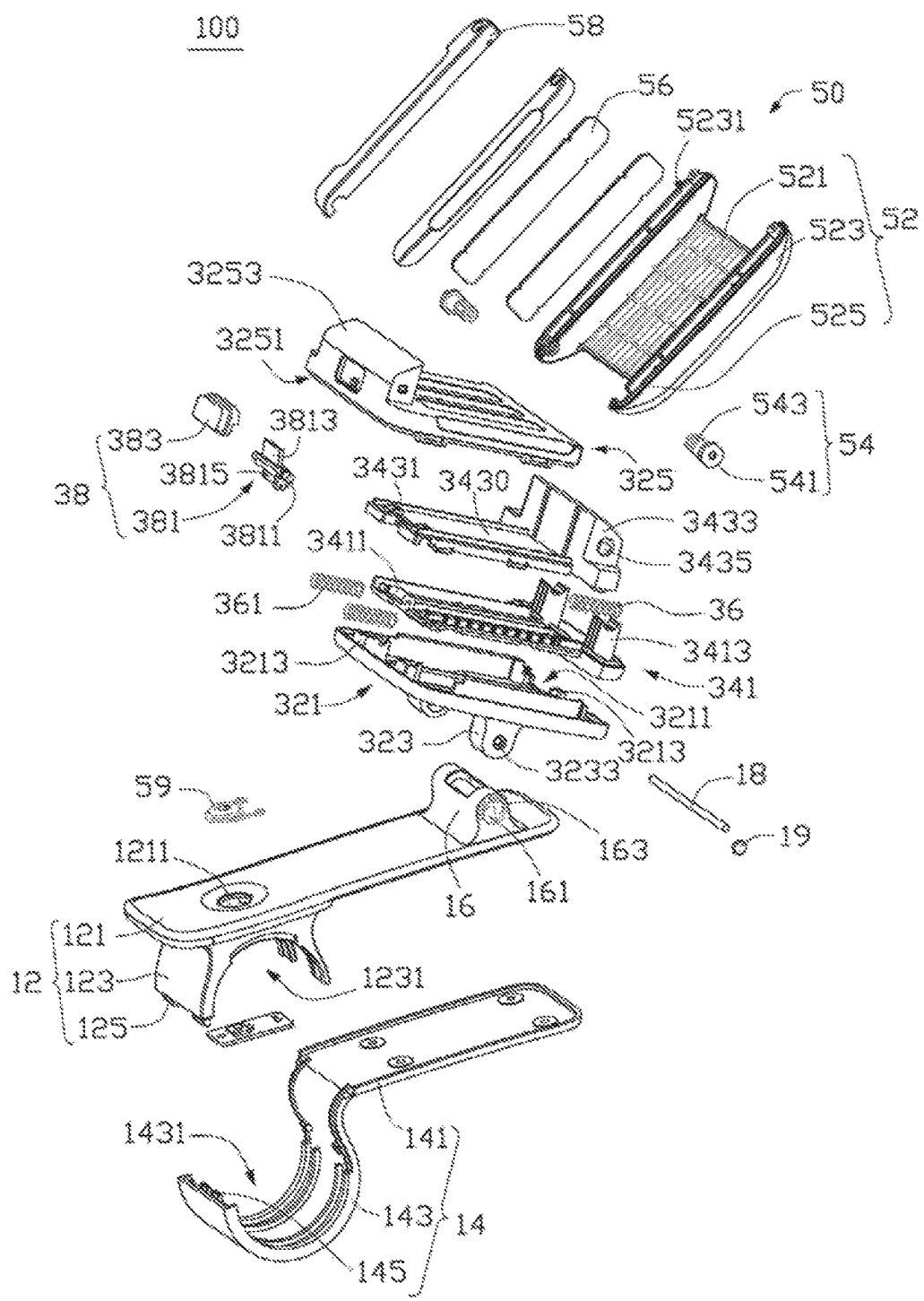
FIG. 7 is an exploded view of the retaining device as shown in FIG. 3.

With reference to FIG. 2, the remote controller 200 comprises gripping members 201 and control sticks 203 arranged on the gripping member 201. The gripping member 201 is approximately "U"-shaped, comprising a supporting part 2011 and two gripping parts 2013 respectively formed at two ends of the supporting part 2011. The supporting part 2011 is approximately cylindrical-shaped, and is used for installing the retaining device 100. A plurality of limiting pits 2014 are recessed in the supporting part 2011 at approximately the middle part thereof. The plurality of limiting pits 2014 are circumferentially arranged on the supporting part 2011 and are spaced apart from each other. The plurality of limiting pits 2014 are used for matching with a part of the structure of the retaining device 100, so as to adjust a mounting position of the retaining device 100 relative to the remote controller 200. The gripping part 2013 is used for providing a part to be hand-held by a photographer, so as to facilitate the operations by the photographer. In this embodiment, the control stick 203 is an operating handle and the number thereof is two. Each control stick 203 is respectively arranged at the end of a corresponding gripping part 2013, and is used for controlling the flying direction of the aerial vehicle.

It can be understood that the gripping member 201 is not necessarily limited to the "U" shape, and can be designed as other shapes, such as a square, a circle or a cylinder. It can be understood that the number of the gripping part 2013 and the control stick 203 can be one or more.

The retaining device 100 corresponding to the plurality of the limiting pits 2014 is installed on the supporting part 2011, and the retaining device 100 comprises a support mechanism 10, a clamping mechanism 30 arranged on the support mechanism 10, and a communication mechanism 50 connected to the clamping mechanism 30. The support mechanism 10 is connected to the gripping member 201; the clamping mechanism 30 is used for installing a display device such as a mobile phone or a display. The communication mechanism 50 and the remote controller 200, as well as the image capturing device, are all communicatively connected and can transmit data with each other. The remote controller 200 remotely controls the flight of the aerial vehicle via the communication mechanism 50, and controls the image capturing device to transmit the image information obtained thereby back to the communication mechanism 50. The communication mechanism 50 transmits the image information to the display device so that the display device displays an image captured in real time.

With reference to FIG. 3 to FIG. 7, the support mechanism 10 comprises a first support member 12, a second support member 14 overlying on the first support member 12, a seat 16 arranged on the first support member 12, a pivot shaft 18 received in the seat 16, and a stopper 19 arranged on the pivot shaft 18.

The first support member 12 comprises a first supporting part 121, a first sheathing part 123 formed on the first supporting part 121, and a matching part 125 formed on the first sheathing part 123.

The first supporting part 121 is approximately rectangular and plate-like, one end thereof is provided with a receiving hole 1211, and the receiving hole 1211 is used for mounting a power supply button 59 for controlling the communication mechanism 50 to be powered on and off. The first sheathing part 123 is approximately semi-cylindrical and is provided with a recessed first receiving part 1231. The first sheathing part 123 is formed at one end of the first supporting part 121, so that the first receiving part 1231 faces away from the first supporting part 121. The first sheathing part 123 is arranged corresponding to the receiving hole 1211, and the first receiving hole 1211 penetrates the first sheathing part 123 from the first supporting part 121. A limiter 1233 (see FIG. 5) is arranged on the side of the first sheathing part 123 which faces away from the first support member 12, and the limiter 1233 is used for matching with the limiting pits 2014 on the supporting part 2011, so as to restrict a rotation position of the retaining device 100 relative to the remote controller 200. The limiter 1233 is movably mounted on the first sheathing part 123, and can protrude out of the surface of the first sheathing part 123. In some embodiments, the limiter 1233 is an elastic plunger; when the retaining device 100 is mounted on the supporting part 2011, the limiter 1233 protrudes and is received in one limiting pit 2014; and when it is needed to adjust a relative mounting position of the retaining device 100, an external force may be applied to the retaining device 100 so as to rotate it relative to the supporting part 2011, thereby causing the limiter 1233 to protrude and to be received in another limiting pit 2014, thus locate the retaining device 100. The matching part 125 is formed at the end of the first sheathing part 123 which faces away from the first supporting part 121, and is used for matching with a part of the structure of the second support member 14, so that the first support member 12 and the second support member 14 are fastened to each other. In some embodiments, the matching part 125 is a snap-fit hole. It can be understood that the matching part 125 can also be a snap-fit groove.

The second support member 14 comprises a second supporting part 141, a second sheathing part 143 formed on the second supporting part 141, and a snapping part 145 formed on the second sheathing part 143.

The second supporting part 141 is approximately rectangular and plate-like, stacked adjacent to the first sheathing part 123 and is coupled with the first supporting part 121. The second sheathing part 143 is approximately semi-cylindrical, and is provided with a recessed second receiving part 1431. The second sheathing part 143 is formed at the end of the second supporting part 141 which is close to the first sheathing part 123, so as to arrange the second receiving part 1431 and the first receiving part 1231 to face each other, the second sheathing part 143 and the first sheathing part 123 are snapped with each other to form a cylindrical bush, and the bush can be sheathed on the supporting part 2011 of the remote controller 200, so that the retaining device 100 is installed on the remote controller 200. The snapping part 145 corresponding to the matching part 125 is formed at one end of the second sheathing part 143 which is away from the second supporting part 141, and is used to be snapped with the matching part 125, so that the first sheathing part 123 and the second sheathing part 143 are snapped with each other. In some embodiments, the snapping part 145 is an elastic snapping hook matching with the snap-fit hole of the matching part 125. It can be understood that the snapping part 145 can also be another snapping structure such as a snapping protrusion, so that the first sheathing part 123 is secured snapped with the second sheathing part 143.

The seat 16 is formed on and protrudes from the side of the first supporting part 121 which faces away from the first sheathing part 123, and is far away from the receiving hole 1211. A pivot connection hole 161 penetrates through the seat 16, and the axis of the pivot connection hole 161 is approximately parallel to the widthwise direction of the first supporting part 121 and is used for receiving the pivot shaft 18. A plurality of limiting recesses 163 are further recessed on two end faces of the seat 16, and the plurality of limiting recesses 163 surround the periphery of the pivot connection hole 161 and are spaced apart from each other. The limiting recesses 163 are used for matching with a part of the structure of the clamping structure 30 so as to adjust the mounting position of the clamping mechanism 30 relative the support mechanism 10.

The pivot shaft 18 is rotatably received in the pivot connection hole 161, and is connected to the clamping mechanism 30, so that the clamping mechanism 30 is pivotably connected to the support mechanism 10. The stopper 19 is arranged at an end part of the pivot shaft 18, so as to prevent the release of the pivot shaft 18 from the support mechanism 10 and the clamping mechanism 30.

Figure 8:
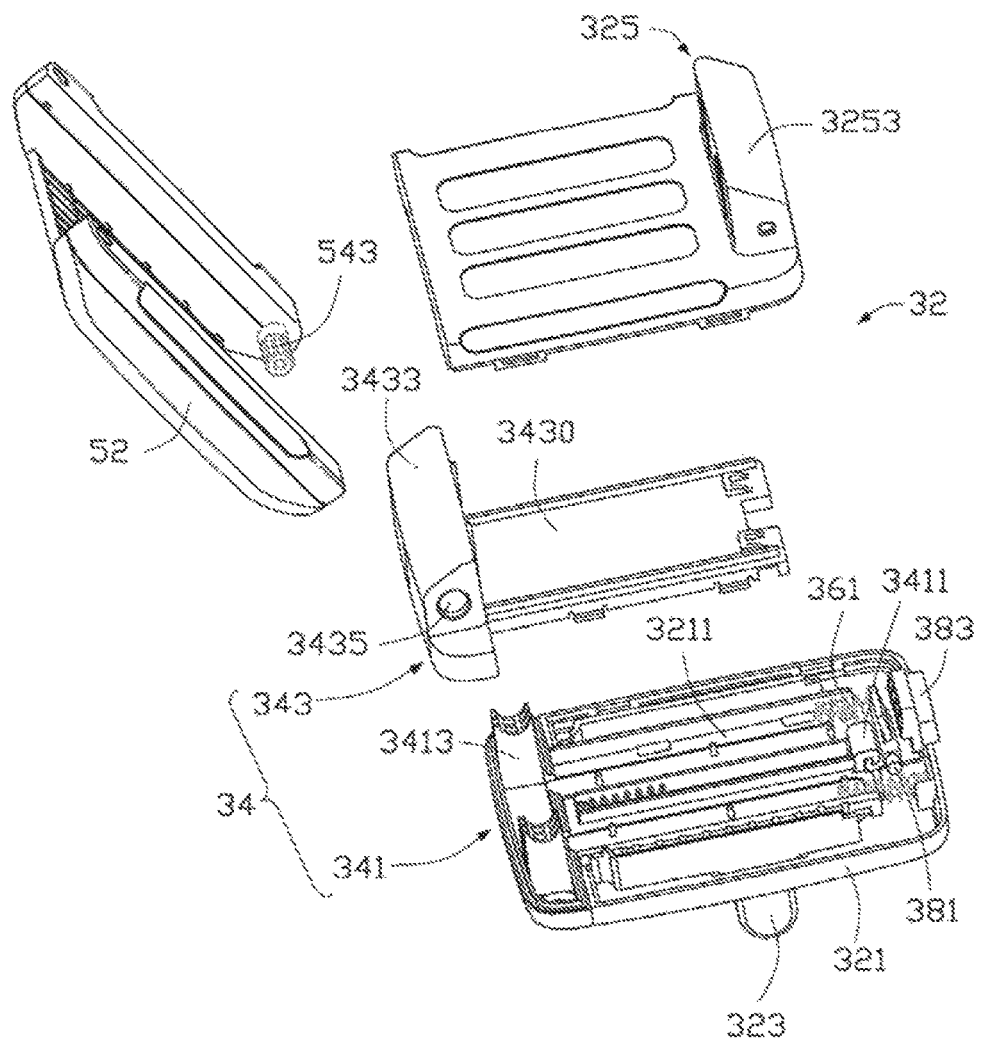
FIG. 8 is another perspective exploded schematic view of the clamping mechanism and the communication mechanism of the retaining device as shown in FIG. 3.

With reference to FIG. 8, the clamping mechanism 30 is pivotably connected to the support mechanism 10, and comprises a connecting assembly 32 connected to the seat 16, and a movable assembly 34, an elastic assembly 36 and a locking assembly 38 all arranged on the connecting assembly 32.

The connecting assembly 32 comprises a first housing 321, a connecting member 323 arranged on the first housing 321, and a second housing 325 covering the first housing 321.

With reference to FIG. 7 again, the first housing 321 is approximately rectangular, and is connected to the first support member 12 via the connecting member 323. A first receiving space 3211 is recessed on the side of the first housing 321 which faces away from the first support member 12, and the first receiving space 3211 is used for partially receiving the movable assembly 34. The first housing 321 is provided with a plurality of installation parts 3213, and the installation parts 3213 are used for locating the elastic assembly 36. In some embodiments, the number of the installation parts 3213 is three. Two of the three installation parts 3213 are formed at and protrude from the edge of the side of the first housing 321 which is close to the first sheathing part 123, the other installation part 3213 is formed at and protrude from the edge of the side of the first housing 321 which is far away from the first sheathing part 123, and all of the three installation parts 3213 extend toward the first receiving space 3211.

With reference to FIG. 6 again, the connecting member 323 is formed on and protrudes from the side of the first housing 321 which faces toward the first support member 12, and is arranged adjacent to the seat 16. In some embodiments, the number of connecting members 323 is two, and the two connecting members 323 are spaced apart from each other, arranged on the first housing 321, and located on two sides of the seat 16, respectively. A plurality of locating protrusions 3231 protrude from the side of each connecting member 323 facing toward the seat 16. The locating protrusions 3231 are used for matching with the limiting recesses 163 so as to adjust the mounting position of the clamping mechanism 30 relative to the support mechanism 10. Each connecting member 323 is provided with a through hole 3233 passing therethrough and corresponding to the pivot connection hole 161, and the through hole 3233 and the pivot connection hole 161 are arranged coaxially. Two ends of the pivot shaft 18 are respectively inserted into the through holes 3233 of two connecting members 323, so that the connecting members 323 and the seat 16 are pivotably connected, and at the same time, the locating protrusions 3231 are received in the corresponding limiting recesses 163 so as to locate the connecting members 323. The stopper 19 is sheathed at the end of the pivot shaft 18 which protrudes out of the connecting member 323, so as to prevent the release of the pivot shaft 18 from the through hole 3233 and thereby prevent the separation of the connecting member 323 from the seat 16. When it is needed to adjust the relative position of the connecting member 323 relative to the seat 16, an external force may be applied to the connecting member 323 to enable it to move relative to the seat 16, the locating protrusion 3231 thereby being received in another limiting recess 163 so as to locate the connecting member 323 again.

The second housing 325 is approximately rectangular, which overlies on and is fastened on the first housing 321, and covers the first receiving space 3211. A second receiving space 3251 is recessed on the side of the second housing 325 which faces toward the first housing 321, the second receiving space 3251 and the first receiving space 3211 together form a receiving cavity, and the receiving cavity is used for receiving a part of the structure of the movable assembly 34.

A first clamping part 3253 is formed on the side of the second housing 325 which faces away from the first housing 321, and the first clamping part 3253 is formed at the end of the second housing 325 which is close to the first sheathing part 123, and extends along the direction facing away from the first support member 12. The first clamping part 3253 has an approximately hollow structure, which is used for receiving a part of the structure of the locking assembly 38 and is able to match with the movable assembly 34 so as to clamp a display device (not shown in the figure) such as a mobile phone or a display.

The movable assembly 34 is partially received in a receiving cavity formed by the first housing 321 and the second housing 325 together, and can move relative to the connecting assembly 32. The movable assembly 34 comprises a sliding member 341, and a movable member 343 overlying on the sliding member 341.

The sliding member 341 is approximately rectangular and plate-like, overlies on the first housing 321, and is received in the first receiving space 3211. A locating part 3411 is formed by bending the end of the sliding member 341 which is close to the first sheathing part 123, and the locating part 3411 has a snapping hook shape which is bent toward the first housing 321 and is used for matching with the locking assembly 38 so as to locate the movable assembly 34. A supporting part 3413 is formed on and protrudes from the end of the sliding member 341 which is away from the locating part 3411, and the supporting part 3413 is used for connecting the movable member 343. In some embodiments, the number of supporting parts 3413 is two, and the shape thereof is approximately quadrangular. The two supporting parts 3413 are spaced apart from each other, and extend along the direction facing away from the first housing 321.

The movable member 343 comprises a plate body 3430, and a stopping part 3431 and a second clamping part 3433 formed on the plate body 3430. The plate body 3430 is approximately rectangular and plate-like, overlies on the side of the sliding member 341 which faces away from the first housing 321, and is received in the receiving cavity together with the sliding member 341. In some embodiments, the number of stopping parts 3431 is three, each stopping part 3431 is arranged corresponding to an installation part 3213 of the first housing 321, respectively, and faces the corresponding installation part 3213. Two of the three stopping parts 3431 are formed on and protrude from the side of the movable member 343 which faces away from the sliding member 341, and the other stopping part 3431 is formed on and protrudes from the side of the movable member 343 which faces toward the sliding member 341. The stopping part 3431 is used for matching with the corresponding installation part 3213, so as to locate and clamp the elastic assembly 36. The second clamping part 3433, corresponding to the supporting part 3413, is formed on and protrudes from the side of the movable member 343 which faces away from the sliding member 341, and is arranged at the end of the movable member 343 which is away from the first clamping part 3253. The second clamping part 3433 is approximately a hollow housing, which extends along the direction facing away from the sliding member 341 and is sheathed on the supporting part 3413. A connecting hole 3435 passes through the second clamping part 3433, and the axis of the connecting hole 3435 is approximately parallel to the axis of the pivot connection hole 161, the connecting hole 3435 being used for connecting the communication mechanism 50. A plurality of engaging teeth (not shown in the figure) protrudes from an inner wall of the connecting hole 3435; the plurality of engaging teeth are circumferentially arranged on the inner wall of the connecting hole 3435 and are spaced apart from each other, and are used for engaging with a part of the structure of the communication mechanism 50 so as to control a rotation angle of the communication mechanism 50 relative to the clamping mechanism 30. When the plate body 3430 overlies on the sliding member 341 and is received in the receiving cavity, the movable assembly 34 can move along the direction approximately parallel to the connecting assembly 32; and the second clamping part 3433 is sheathed on the supporting part 3413, protrudes out of the surface of the second housing 325, and is approximately parallel to and faces the first clamping part 3253. Under the effect of an external force, the second clamping part 3433 can be relatively far away from or close to the first clamping part 3253, so that the movable assembly 34 can retain display devices of different sizes.

The elastic assembly 36 is received in a receiving cavity formed by the first housing 321 and the second housing 325 together, one end thereof is connected to the connecting assembly 32, and the other end thereof abuts against the movable assembly 34. In some embodiments, the elastic assembly 36 comprises three elastic members 361, and the three elastic members 361 are all compression springs. One end of each elastic member 361 is sheathed on an installation part 3213, and the other end thereof abuts against a stopping part 3431 corresponding to the installation part 3213. In the initial state, two elastic members 361 corresponding to the first clamping part 3253 are in a compressed state, and the elastic member 361 corresponding to the second clamping part 3433 is in a tensioned state. When the second clamping part 3433 moves away from the first clamping part 3253, two elastic members 361 corresponding to the first clamping part 3253 are gradually stretched, and the other elastic member 361 is gradually compressed to store elastic potential energy and thereby provide a restoring force for the movement of the movable assembly 34.

With reference to FIG. 7 again, the locking assembly 38 is arranged on the second housing 325, and is used for fixing the mounting position of the movable assembly 34 relative to the connecting assembly 32. The locking assembly 38 comprises an actuation member 381 and a pressing member 383.

With reference to FIG. 4 again, the actuation member 381 is received in the first clamping part 3253 and comprises a pivot connection part 3811, and a transmission part 3813 and a snap-fit part 3815 respectively formed on two sides of the pivot connection part 3811. The pivot connection part 3811 is in an approximately cylindrical rod shape. Two ends of the pivot connection part 3811 are pivotably connected to the inner wall of the first clamping pan 3253. The transmission part 3813 is formed on and protrudes from the circumferential wall of the pivot connection part 3811, and extends along the radial direction of the pivot connection part 3811 which faces away from the first housing 321. The snap-fit part 3815 is opposite to the transmission part 3813, and is formed on the other side of the circumferential wall of the pivot connection part 3811. In some embodiments, the snap-fit part 3815 is a snapping hook which is bent away from the first housing 321. The snap-fit part 3815 is used for snapping with the locating part 3411, so as to fix the relative mounting position of the movable assembly 34 relative to the connecting assembly 32. The snap-fit part 3815 and the locating part 3411 are both made of an elastic material, and when the locating part 3411 is affected by an external force to abut against the snap-fit part 3815, they are fastened to each other after elastic deformation occurs. When the transmission part 3813 is pushed by an external force to cause the actuation member 381 to rotate around the axis of the pivot connection part 3811, and when the snap-fit part 3815 is relatively far away from the locating part 3411, the snap-fit part 3815 can generate elastic deformation and be released from the state of being fastened to the locating part 3411.

The pressing member 383 is approximately block-shaped, and is movably retained on the side of the first clamping part 3253 which faces away from the second clamping part 3433. One end of the pressing member 383 protrudes out of the first clamping part 3253, and the other end is received in the first clamping part 3253 and abuts against the transmission part 3813. When the end of the pressing member 383 which protrudes out of the first clamping part 3253 is pressed by an external force, the pressing member will move towards the inside of the first clamping part 3253, and abuts against and pushes the transmission part 3813 so as to rotate the actuation member 381, and then the snap-fit part 3815 is released from the locating part 3411.

The communication mechanism 50 is connected to the second clamping part 3433, which is used for sending remote control commands from the remote controller 200 to the aerial vehicle, and sending back image information obtained by the image capturing device to the display device. The communication mechanism 50 comprises a receiving member 52, a connecting shaft 54, an antenna 56 and a cover member 58 all arranged on the receiving member 52, and a power supply button 59 arranged on the first support member 12. The communication mechanism 50 is connected to the second clamping part 3433 via the connecting shaft 54, and transmits data via the antenna 56.

The receiving member 52 is rotatably connected to the second clamping part 3433. The receiving member 52 comprises a body 521, an accommodating part 523 formed on the body 521, and a connecting part 525 formed on the accommodating part 523. The body 521 is approximately rectangular and plate-like. In some embodiments, the number of accommodating parts 523 is two, and the two accommodating parts 523 are respectively formed on two opposite sides of the body 521. A receiving groove 5231 is recessed in each accommodating part 523, and the receiving groove 5231 is used for receiving the antenna 56. In some embodiments, the number of connecting parts 525 is two, and each connecting part 525 is formed at the end of an accommodating part 523 which is close to the second clamping part 3433, and is used for installing the connecting shaft 54. Two connecting parts 525 are respectively located at two ends of the connecting hole 3435 of the second clamping part 3433.

In some embodiments, the number of connecting shafts 54 is two, and each connecting shaft 54 is arranged on a corresponding connecting part 525. The connecting shaft 54 comprises a joining part 541 and a rotation part 543 formed on the joining part 541. The joining part 541 is approximately cylindrical, and is fixedly connected to the connecting part 525. The rotation part 543 is approximately cylindrical, and is formed at one end of the joining part 541. The rotation part 543 is coaxially arranged with the connecting hole 3435, and is received in the connecting hole 3435. A plurality of matching teeth protrudes from the circumferential wall of the rotation part 543, and the plurality of matching teeth are circumferentially arranged on the rotation part 543 and are spaced apart from each other. The plurality of matching teeth are engaged with a plurality of engaging teeth arranged in the connecting hole 3435, so that a mounting angle of the communication mechanism 50 relative to the clamping mechanism 30 can be adjusted as needed. In the case where no display device is clamped, the communication mechanism 50 overlies on and is coupled with the second housing 325, and the body 521 of the receiving member 52 is received between the first clamping part 3253 and the second clamping part 3433. When it is needed to clamp a display device, an external force is applied to the communication mechanism 50 so as to cause it to rotate around the axis of the connecting shaft 54 until an included angle between the communication mechanism 50 and the clamping mechanism 30 is the required angle.

In some embodiments, the number of antennas 56 and the number of cover members 58 are both two. Each antenna 56 is received and fixed in one receiving groove 5231, and each cover member 58 covers one receiving groove 5231. A power supply button 59 is arranged on the first support member 12; a lead wire (not shown in the figure) inside the remote controller 200 is electrically connected to the power supply button 59, and is electrically connected to the antenna 56 via the support mechanism 10 and the clamping mechanism 30.

When assembling the above-mentioned retaining device 100, firstly, the sliding member 341 is arranged on the first housing 321, the movable member 343 overlies on the sliding member 341, and then two ends of the elastic member 361 are respectively connected to the first housing 321 and the movable member 343. Secondly, the lead wire (not shown in the figure) penetrates the first housing 321 and the movable assembly 34 from the first support member 12, then the locking assembly is mounted on the second housing 325, and the second housing 325 is fastened to the first housing 321. Thereafter the clamping mechanism 30 is installed on the first support member 12 via the connecting member 323, and then the second clamping part 3433 is pushed toward the first clamping part 3253 so that the actuation member 381 is snapped to the locating part 3411. Further, the antenna 56 is installed on the receiving member 52, and then the lead wire is threaded into the receiving member 52 and is electrically connected to the antenna 56. The cover member 58 is installed to cover the receiving groove 5231, and then the communication mechanism 50 is connected to the clamping mechanism 30 via the connecting shaft 54. Lastly, the second support member 14 is snapped with the first support member 12, and the communication mechanism 50 is rotated to overlie on the clamping mechanism 30.

When using the above-described retaining device 100 and the remote controller 200, firstly, the lead wire in the remote controller 200 is electrically connected to the power supply button 59 arranged on the retaining device 100, the second support member 14 is separated from the first support member 12, so that the first sheathing part 123 and the second sheathing part 143 are respectively located on two sides of the supporting part 2011, and then the second support member 14 is snapped with the first support member 12, so that the limiter 1233 in the first sheathing part 123 protrudes into a limiting pit 2014 on the supporting part 2011. Secondly, an external force is applied to the communication mechanism 50 so as to cause it to rotate around the axis of the connecting shaft 54, until a pre-set included angle is formed between the communication mechanism 50 and the clamping mechanism 30. Further, an external force is applied to the pressing member 383, so that the actuation member 381 and the locating part 3411 are released from the snap-fitting; the elastic member 361 close to the first clamping part 3253 changes from a compressed state to a normal state, and at the same time, the elastic force thereof pushes the movable assembly 34 to move relative to the connecting assembly 32, so that the second clamping part 3433 is away from the first clamping part 3253. The external force is further applied to the second clamping part 3433 so as to cause it to move away from the first clamping part 3253, and at this time, the elastic member 361 close to the first clamping part 3253 is stretched from the normal state and stores elastic potential energy, while the elastic member 361 close to the second clamping part 3433 is compressed and stores elastic potential energy. When the distance between the first clamping part 3253 and the second clamping part 3433 meets requirements, and a display device such as a mobile phone or a tablet is installed between the first clamping part 3253 and the second clamping part 3433, the second clamping part 3433 is released, and the three elastic members 361 all have the tendency of returning to the normal state from a deformed state, the elastic force of which is converted into a clamping force for the display device, thereby retaining the display device on the remote controller 200. Lastly, the power supply button 59 is pressed, so that the communication mechanism 50 establishes a data connection with the aerial vehicle, the image capturing device arranged on the aerial vehicle and the display device, and the flight of the aerial vehicle is controlled via the remote controller 200.

When it is needed to adjust the mounting angle of the retaining device 100 relative to the remote controller 200, an external force is applied to the support mechanism 10 so as to cause it to rotate to a required mounting angle relative to the supporting part 2011, and the limiter 1233 matches with the limiting pit 2014 arranged on the supporting part 2011 so as to locate the retaining device 100. When it is needed to adjust the viewing angle of the display device, an external force is applied to the clamping mechanism 30 so as to cause it to rotate to a required mounting angle relative to the support mechanism 10, and the locating protrusion 3231 matches with the limiting recess 163 so as to locate the clamping mechanism 30.

The retaining device 100 of the present disclosure integrates the communication mechanism 50 into the clamping mechanism 30; in the case where no display device is clamped, the communication mechanism 50 overlies on and is coupled with the second housing 325; when it is needed to clamp a display device, the communication mechanism 50 can be opened to a required angle relative to the clamping mechanism 30. The above-mentioned structure enables the remote controller 200 provided with a retaining device 100 to have a compact overall structure and a relatively light weight. Meanwhile, by matching the locating protrusion 3231 and the limiting recess 163, a photographer can easily adjust the mounting angle of the clamping mechanism 30, thereby conveniently adjusting the viewing angle of the display device. In addition, the first clamping part 3253 and the second clamping part 3433 together clamp the display device, the second clamping part 3433 can move relative to the first clamping part 3253, so that the retaining device 100 is suitable for display devices of different sizes, and the retaining device has a wide application range. Lastly, by matching the limiter 1233 and the limiting pit 2014 arranged on the supporting part 2011 of the remote controller 200, the mounting position of the retaining device 100 as a whole, relative to the remote controller 200 is adjustable so that the remote controller 200 is more flexible in use.

It can be understood that the elastic member 361 can be an elastic body of other structures, such as a torsional spring, a wind spring or an elastic bush, one end of the elastic member is connected to the connecting assembly 32, and the other end thereof abuts against the movable assembly 34 so as to provide a restoring force for the movement of the movable assembly 34, or provide a clamping force when the movable assembly 34 is in the working state so that the movable assembly 34 can retain display devices of different sizes. It can be understood that the number of elastic members 361 can be one or more.

It can be understood that the second housing 325 can be omitted, and when assembling the clamping mechanism 30, the first clamping part 3253 is formed on the first housing 321 in order to arrange the first clamping part and the second clamping part 3433 to face each other so as to clamp the display device together.

It can be understood that the sliding member 341 can be omitted, and when assembling the clamping mechanism 30, the locating part 3411 is formed on the movable member 343, then the movable member 343 overlies on the first housing 321, so that the locating part 3411 is coupled to the actuation member 381 so as to fix the mounting position of the movable member 343 on the first housing 321.

It can be understood that the snap-fit part 3815 and the locating part 3411 can be made of a rigid material, and when assembling the retaining device 100, an elastic reset member (not shown in the figure) is additionally provided between the actuation member 381 and the first clamping part 3253, so that one end of the elastic reset member abuts against the snap-fit part 3815 or the locating part 3411 of the actuation member 381, and the other end thereof abuts against the inner wall of the first clamping part 3253. When the transmission part 3813 is abutted and pushed by an external force to cause the actuation member 381 to rotate as a whole, around the axis of the pivot connection part 3811, the elastic reset member provides a restoring force for the resetting of the actuation member 381.

In addition, a person skilled in the art could also make other changes in the spirit of the present disclosure, and these changes made according to the spirit of the present disclosure shall fall within the scope of the present disclosure.

What is claimed is:

1. A remote controller, comprising:
   a gripping member;
   a control stick arranged on the gripping member; and
   a retaining device installed on the gripping member, the retaining device comprising:
      a support mechanism;
      a clamping mechanism rotatably installed on the support mechanism and comprising:
         a first clamping part; and
         a second clamping part opposite to the first clamping part; and
      a communication mechanism rotatably connected to the clamping mechanism and comprising:
         a receiving member;
         a connecting shaft arranged on the receiving member and pivotably connecting the receiving member with the second clamping part, the connecting shaft being configured to allow the receiving member to rotate relative to the second clamping part and to be received between the first clamping part and the second clamping part; and
         an antenna arranged on the receiving member and configured to transfer data.

2. The remote controller of claim 1, wherein:
   the second clamping part comprises:
      a connecting hole formed through the second clamping part; and
      a plurality of engaging teeth protruding from an inner wall of the connecting hole,
   a first end of the connecting shaft is connected to the receiving member and a second end of the connecting shaft is rotatably received in the connecting hole, and
   the connecting shaft comprises matching teeth formed on the second end and engaged with the plurality of engaging teeth.

3. The remote controller of claim 1, wherein:
   the clamping mechanism further comprises a housing, a movable member movably arranged on the housing, and an elastic member arranged between the housing and the movable member,
   the first clamping part is connected to the housing,
   the second clamping part is formed on the movable member, and
   a first end of the elastic member is connected to the housing and a second end of the elastic member abuts against the movable member.

4. The remote controller of claim 3, wherein:
   the housing comprises an installation part,
   the movable member comprises a stopping part corresponding to the installation part, and
   the first end of the elastic member is connected to the installation part and the second end of the elastic member abuts against the stopping part.

5. The remote controller of claim 3, wherein:
   the housing is a first housing,
   the clamping mechanism further comprises a second housing fastened with the first housing,
   the first clamping part is formed on the second housing, and
   one end of the movable member is movably received between the first housing and the second housing.

6. The remote controller of claim 5, wherein:
   the clamping mechanism further comprises a sliding member overlying the first housing, the sliding member comprising a supporting part protruding from the sliding member,
   the movable member overlies the sliding member and is partly received together with the sliding member between the first housing and the second housing, and
   the second clamping part is sheathed on the supporting part.

7. The remote controller of claim 6, wherein:
   the clamping mechanism further comprises a locking assembly arranged on the first clamping part and comprising a snap-fit part, and
   the sliding member further comprises a locating part snap-fitting with the snap-fit part.

8. The remote controller of claim 7, wherein:
   the snap-fit part is made of an elastic material, and is configured to be placed into or released from the locating part when elastic deformation occurs, and
   the locating part is made of an elastic material, and is configured to be placed into or released from the snap-fit part when elastic deformation occurs.

9. The remote controller of claim 7, wherein:
   the locking assembly comprises:
      a pressing member;
      an actuation member received in the first clamping part; and
      an elastic reset member received in the first clamping part, one end of the elastic reset member abutting against the actuation member, and another end of the elastic reset member abutting against the first clamping part, the snap-fit part is formed on the actuation member, and the pressing member is movably installed on the first clamping part and abuts against the actuation member.

10. The remote controller of claim 9, wherein:

the actuation member further comprises:

a pivot connection part rotatably arranged in the first clamping part; and a transmission part formed on the pivot connection part, the snap-fit part is formed on the pivot connection part and faces away from the transmission part, and the actuation member abuts against the pressing member.

11. The remote controller of claim 1, wherein:

the gripping member comprises a supporting part and a gripping part formed on the supporting part, the control stick is arranged on the gripping part, and the retaining device is rotatably sheathed on the supporting part via a bush.

12. The remote controller of claim 11, wherein:

the supporting part comprises a plurality of limiting pits circumferentially arranged on the supporting part and spaced apart from each other, and the first sheathing part comprises a limiter corresponding to the limiting pits, the limiter protruding out of a surface of the first sheathing part and being received in at least one of the limiting pits.

13. A remote controller, comprising:

a main body; and a retaining device, comprising:

a clamping mechanism comprising a clamping space;

a support mechanism rotatably connected to the clamping mechanism, an end of the support mechanism that is far away from the clamping mechanism being connected to the main body; and a communication mechanism movably connected to the clamping mechanism and configured to:

be received in the clamping space, when clamping an object, move relative to the clamping mechanism to an outside of the clamping space, and when not clamping the object, move relative to the clamping mechanism into the clamping space.

14. The remote controller of claim 13, wherein:

the communication mechanism is rotatably connected to the clamping mechanism, and configured to rotate into the receiving space, or the communication mechanism is slidably connected to the clamping mechanism, and configured to slide into the receiving space.

15. The remote controller of claim 13, wherein a size of the clamping space is adjustable.

16. The remote controller of claim 15, wherein:

the clamping mechanism comprises a first clamping part and a second clamping part opposite to the first clamping part, the first clamping part and the second clamping part together form the clamping space, and the first clamping part and the second clamping part are configured to slide relative to each other so as to change the size of the clamping space.

17. The remote controller of claim 13, wherein the end of the support mechanism that is far away from the clamping mechanism is rotatably connected to the main body.

18. The remote controller of claim 17, wherein:

the support mechanism comprises a support limiting part, and the main body comprises a support matching part matching the support limiting part so as to restrict a rotation angle of the support mechanism relative to the main body.

19. The remote controller of claim 18, wherein:

the support matching part comprises a plurality of limiting pits arranged on the main body, the support limiting part comprises a limiter arranged on the support mechanism, and the limiter is selectively received in one of the limiting pits.

20. The remote controller of claim 13, wherein:

the main body comprises a U-shaped gripping member and control sticks arranged at two ends of the gripping member, and the end of the support mechanism that is far away from the clamping mechanism is sheathed at a middle part of the gripping member.

* * * * *